June 23, 1953　　　J. M. GOMEZ-DIEZ　　　2,642,739
METHOD OF TESTING ELECTRIC CABLE SHEATHS
Filed Aug. 24, 1949　　　　　　　　　　　2 Sheets-Sheet 2

INVENTOR
JOSÉ MARÍA GOMEZ DIEZ
ATTORNEY

Patented June 23, 1953

2,642,739

UNITED STATES PATENT OFFICE 2,642,739

METHOD OF TESTING ELECTRIC CABLE SHEATHS

Jose M. Gomez-Diez, Maliano (Santander) Spain, assignor to International Standard Electric Corporation, New York, N. Y., a corporation of Delaware Application August 24, 1949, Serial No. 111,996
In Great Britain August 27, 1948

3 Claims. (Cl. 73—40)

This invention relates to the manufacture of electric cables of the dry core type and more particularly to a method of testing the sheaths of such cables during the course of such manufacture.

Dry core electric cables are usually sheathed with lead applied by extrusion and it is important to ensure that the sheath is free of pin holes or other leaks, since otherwise moisture may enter the cable core and damage the insulation of the core.

It is at present common practice to test the cable after manufacture by immersing the factory length of sheathed cable in water for a period and then testing the electric insulation to determine whether moisture has entered the core through pin holes in the sheath and affected the insulation. If it is found that water has entered the core, the sheath is then stripped off the core thoroughly dried, a fresh sheath is applied and then the testing process repeated.

It is one of the objects of the present invention to provide a method for testing the sheath of an electric cable of the dry core type which is less tedious and more economical than that described above.

According to the present invention a method of testing the sheath of a sheathed electric cable of the dry core type comprises sealing the two ends of a cable length whilst the temperature of said length is at a first temperature, allowing the sealed length to cool to a second temperature lower than the first temperature thereby creating a reduced pressure in the cable length and then measuring the pressure within said cable length so that any leakage of the sheath may be detected without damage to the cable core. This pressure measurement is affected by use of the apparatus according to this invention as will be hereinafter described.

As all types of cable sheath are usually applied by a process such as hot extrusion which involves incidental heating of the cable, it is convenient to seal the cable length before it cools, for example by sealing the leading end of the cable promptly after it emerges from the extrusion press and sealing the trailing end promptly after application of the sheath is completed and the trailing end has emerged from the press.

The invention will be better understood from the following detailed description when taken in conjunction with the accompanying drawings in which.

Figure 2:
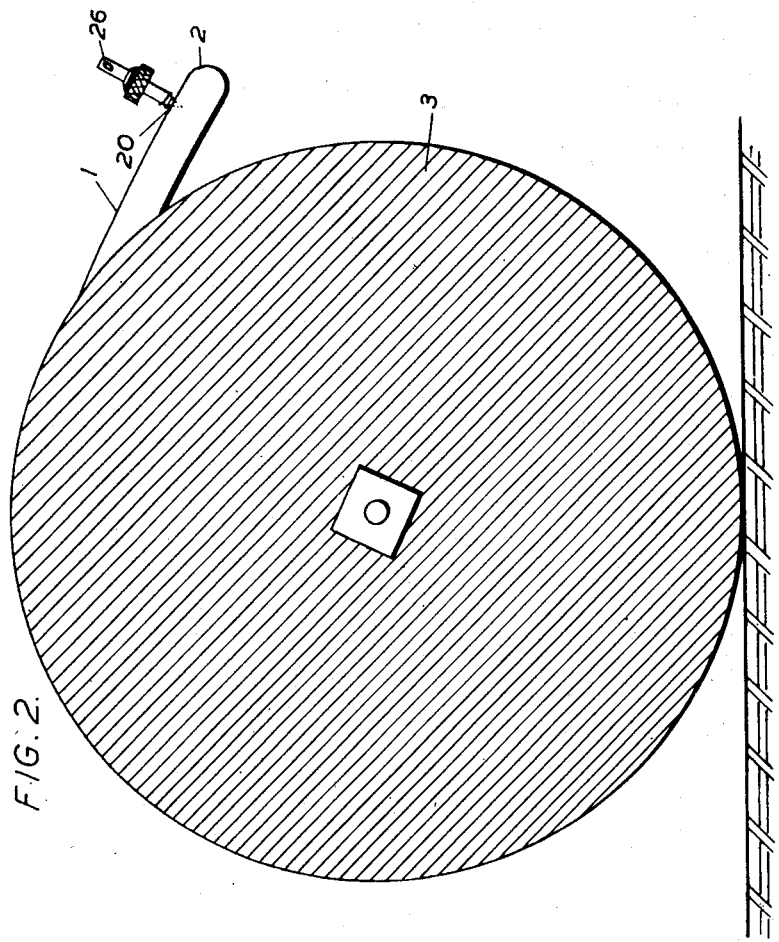
Fig. 2 is a side elevational view of a reeled cable length with the pressure gauge applied to one end.

Referring to the drawings, Fig. 2 shows a cable reel from which one end of a cable protrudes, provided with a lead sheath 1 sealed over at 2. In practicing the method according to the invention the leading end of the cable is sealed as promptly as convenient as it is emerging from the lead-extrusion press, for instance with solder in a similar manner to that shown at 2, and as the cable length emerges from the press it is coiled on a reel 3 after the full length of cable was passed through the press, the trailing end is sealed, as shown at 2, promptly after emerging from the press. The reeled cable is then allowed to stand at ordinary temperature for a time of at least 10 hours or sufficient to effect cooling whereby the pressure within the sheath decreases appreciably below its initial pressure provided the lead sheath be free of pin holes or other leaks. A small blind hole is then made in the lead sheath, preferably at one end, by means of a suitable punch to serve as a lead hole for a screw-threaded tube to be inserted therein communicating with a pressure gauge.

Figure 1:
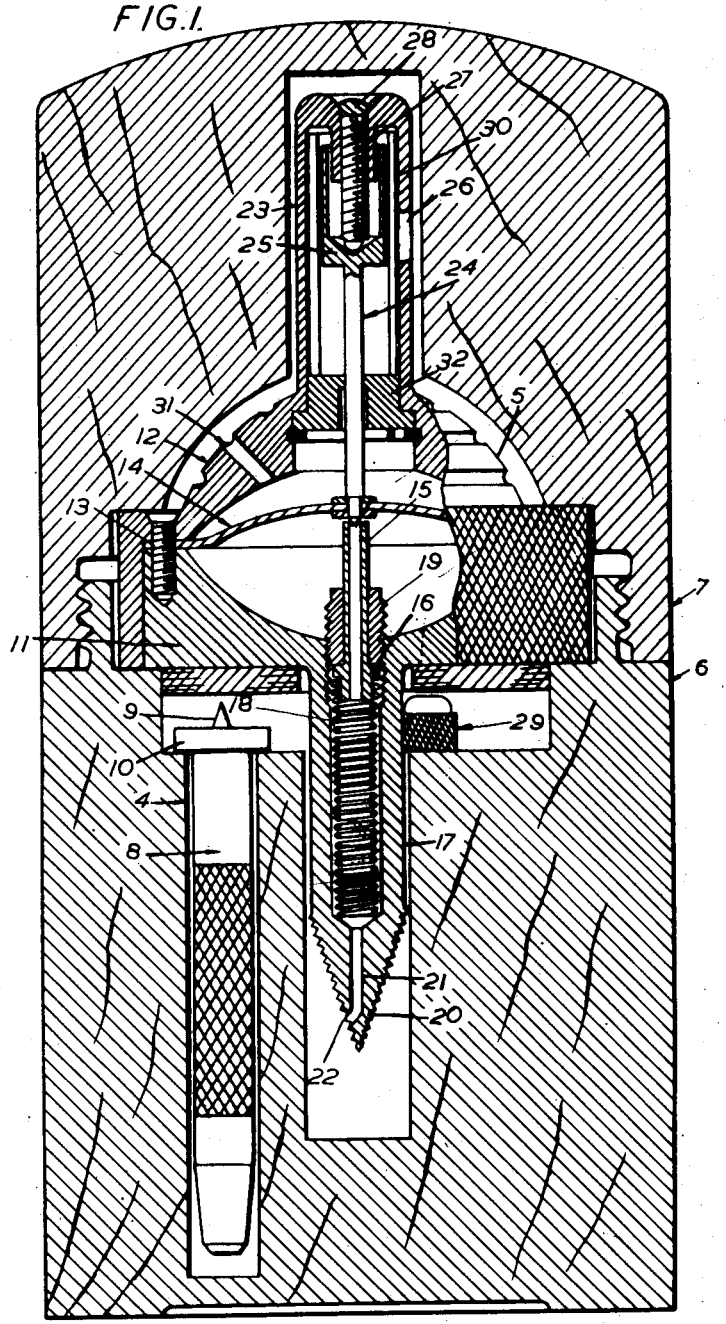
Fig. 1 is a partial cross sectional view of a box containing a tool for piercing a cable sheath and a pressure gauge shown partly in section.

Fig. 1 shows a suitable punch 4 and a suitable form of gauge 5 in a wooden container in which they may be kept for protection when not in use. The container consists of a body portion 6 and a screw-on lid 7. The punch 4 consists of a cylindrical stem 8, pointed tip 9 and a flange 10. The tip 9 is of just sufficient length to penetrate the required depth into a lead sheath while being restricted by the flange 10 from penetrating all the way through the sheath with consequent breaking of the vacuum and possible damage to the core.

The gauge 5 consists of two cup-like elements 11, 12 secured together in facing relationship by screws 13 to define a central cavity within which an air tight diaphragm 14, of leather or rubber, is positioned with its edges clamped between the elements 11, 12. A hollow plunger 15 slidably supported in a sleeve 19 mounted in a portion of the element 11, abuts at one end against the underside of the diaphragm 14 and is provided at its opposite end with a head 16, moveable within the hollow portion of a stem 17 which forms an extension of the part 11. The plunger 15 is urged upwards by a spring 18 located in the stem 17 and abutting against the head 16, being limited in its upward motion by an insert 19 positioned at the top of the stem 17. The distal end of the stem 17 is provided with a hardened screw threaded conical portion 20 having a passage 21 formed therein terminating in an aperture 22 close to the tip thereof. It will thus be seen that when the conical tip is screwed into a blind opening in a cable sheath the underside of the diaphragm is exposed to the pressure within the sheath through the passages 22, 21 and the hollow stem 15.

The cup-like element 12 is formed with a tubular extension 23. A pin 24 fixed to the diaphragm 14 is axially slidably supported centrally of this extension in a bush 32 and carries an open cylindrical head 25 on the free end thereof provided with markings which can be viewed through an aperture 26 formed in the extension 23. A glass tube 30 closely fitted inside the extension 23, surrounds the head 25 and prevents entry of dust through the aperture 26.

The space above the diaphragm 14 is in communication with the atmosphere through an aperture 31 formed in the wall of the casing. The gauge is initially adjusted so that a first indicating mark on the head 25 is seen through the aperture 26, corresponding to a condition in which both sides of the diaphragm are at the same pressure viz. atmospheric pressure, the spring 18 being adjusted to maintain the diaphragm and indicator in this normal position by means of a screw 27, mounted in the upper end of stem 23, abutting the interior of the head 25 in opposition to the action of the spring 18. After this adjustment has been affected, the head of the screw 27 is then sealed at 28 with low melting point wax. A screw-driver for carrying out this adjustment, the knurled head of which is shown at 29 on Fig. 1, is conveniently housed in the body.

In use, the point of the screw threaded end 20 of the gauge is inserted into the blind hole which has been made in the lead sheath by the tool 4, and rotated to cause this end 20 to be screwed into the sheath sufficiently for the aperture 22 to communicate with the interior of the sheath substantially as shown in Fig. 2.

If the sheath is free of pin holes or similar imperfections the pressure in the space within the sheath and therefore also on the underside of the diaphragm 14 will be below atmospheric pressure and therefore atmospheric pressure acting on the top of diaphragm 14 will move the diaphragm and with it the head 25. The first indicating mark previously visible through aperture 26 will disappear from view and a second indicating mark provided on the head 25 will then occupy a position such that it will be visible through the aperture 26. These indicating marks on the head 25 may be differently coloured circular spots if desired.

If however the sheath of the cable has leaks (i. e. pinholes or the like) the space within the sheath during cooling will have attained atmospheric pressure by entry of air through these leaks and the gauge head 25 will not move. When this condition is observed, the exact location of the pin hole or other leak in the sheath can then be ascertained by removing the gauge, pumping dry air or other gas into the interior of the sheath to raise its pressure above atmospheric pressure and then, whilst the length of cable is immersed in water, observing the place where the escape of such air or gas occurs. It frequently will be found that these defects in the sheath occur near one end thus only a small portion of the total length of cable need be cut as to remove the defective portion.

While the principles of the invention have been described above in connection with specific embodiments and particular modifications thereof, it is to be clearly understood that this description is made only by way of example and not as a limitation of the scope of the invention.

What I claim is:

1. A method of testing the sheath of electric dry core type cable that comprises sealing both ends of a cable length whilst it is at a first temperature, allowing the sealed length to cool to a second temperature lower than the first temperature thereby creating a reduced pressure inside the cable sheath if free of leaks, and then comparing the pressure inside and outside the sheath of the said cable length.

2. A method of testing the sheath of an electric dry core type cable that comprises sealing both ends of a cable length whilst it is at a temperature above room temperature, allowing the sealed length to cool thereby creating a reduced pressure inside the cable sheath if free of leaks and then comparing the pressure inside and outside the sheath of the said cable length.

3. A method of testing an extruded sheath of a sheathed dry core type electric cable that comprises sealing the ends of the extruded sheath whilst the cable is still hot from having the sheath extruded thereon, allowing the cable length to cool appreciably and then comparing the pressure inside and outside said cable sheath.

JOSE M. GOMEZ-DIEZ.

References Cited in the file of this patent

UNITED STATES PATENTS

| Number | Name | Date |
|---|---|---|
| 882,141 | Cope | Mar. 17, 1908 |
| 1,640,911 | Skoog | Aug. 30, 1927 |
| 1,950,304 | High | Mar. 6, 1934 |
| 2,071,698 | Maple | Feb. 23, 1937 |